Jan. 19, 1965 S. KAY 3,166,363
SPLIT ROLLER BEARINGS
Filed Aug. 15, 1962 4 Sheets-Sheet 1

INVENTOR
SYDNEY KAY, DECEASED
BY SYDNEY PITFIELD KAY, EXECUTOR
ATTY.

Jan. 19, 1965 S. KAY 3,166,363
SPLIT ROLLER BEARINGS
Filed Aug. 15, 1962 4 Sheets-Sheet 2
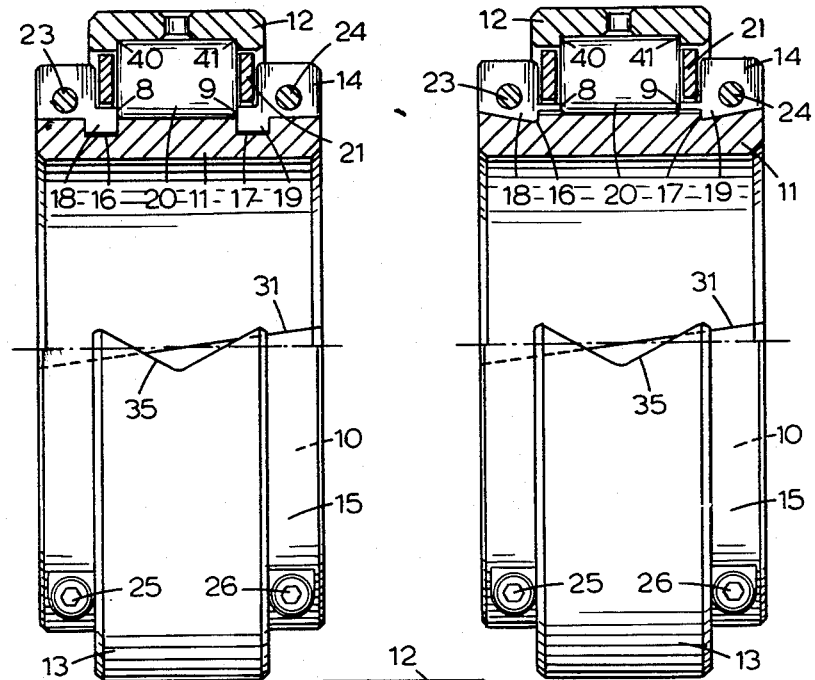
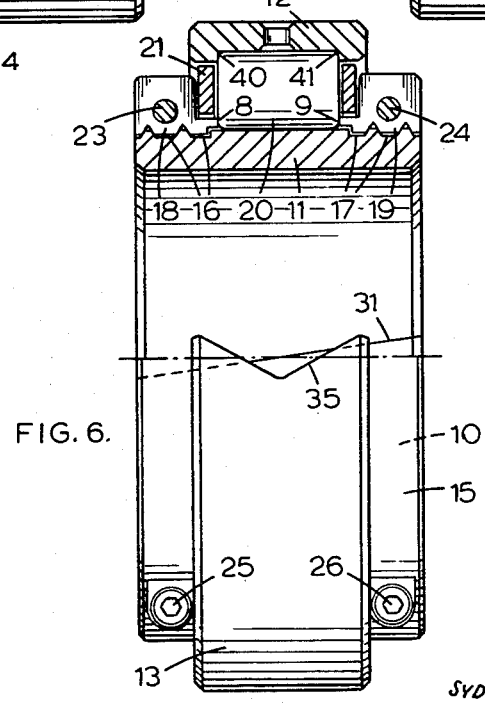
INVENTOR
SYDNEY KAY, DECEASED
BY SYDNEY PITFIELD KAY, EXECUTOR
By Irwin A. Thompson
ATTY.

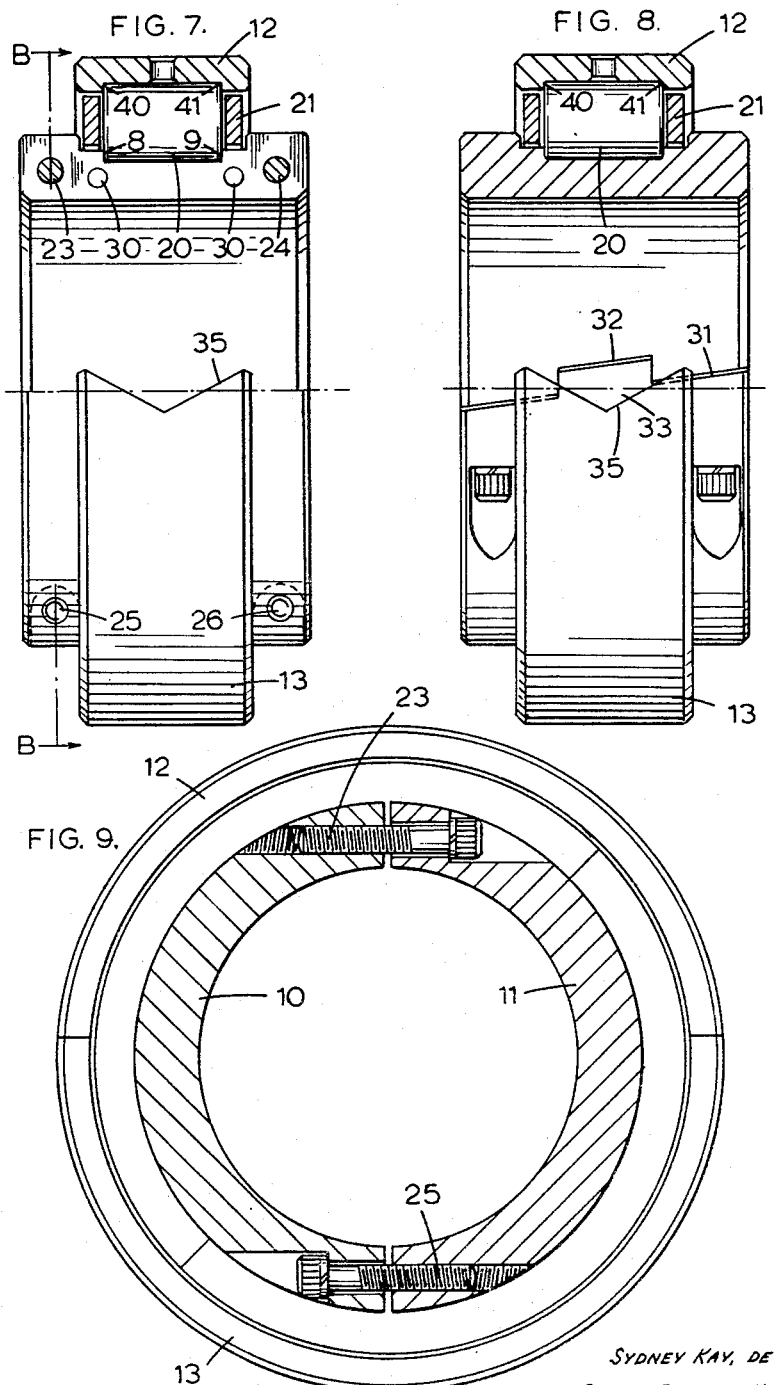

United States Patent Office 3,166,363
Patented Jan. 19, 1965

3,166,363
SPLIT ROLLER BEARINGS
Sydney Kay, deceased, late of Norfolk, England, by Sydney Pitfield Kay, executor, Bexley, England, assignor to Cooper Roller Bearings Company Limited, Norfolk, England, a British company
Filed Aug. 15, 1962, Ser. No. 217,211
Claims priority, application Great Britain, Aug. 24, 1961, 30,558/61
1 Claim. (Cl. 308—207)

This invention relates to split roller bearings having an inner race which is split to form two semi-circular parts to facilitate assembly on a shaft, an outer race which is similarly split, and a cage located between these races and holding the rollers in spaced relationship circumferentially of the races.

It is usual to provide a shaft at opposite ends thereof with two types of such bearings, viz. a locating type and a non-locating type, the former holding the shaft against axial movement while the latter permits a certain axial float to accommodate expansion and contraction of the shaft due, for example, to variation of temperature or to shaft deflection. It is known to provide the locating type of bearing with clamping rings for clamping the split inner race on the shaft but various difficulties are experienced with known designs. First, the locating bearing is longer axially than the non-locating bearing so that housings of different sizes are required whereas it would be advantageous to be able to make housings all of the same size for either kind of bearing. Moreover, difficulty is experienced in locating the races and bearings axially in relation to each other without axial displacement causing friction between moving parts. Still further difficulties arise in production in relation to ease of machining, grinding and hardening.

The object of the invention is to provide improved bearings of the locating kind.

According to the invention the bearing comprises an inner race split into two semi-circular parts, an outer race split into two semi-circular parts, rollers between the races, a cage for locating the rollers in spaced relationship circumferentially of the races, and annular clamping means similarly split and located on each side of the inner race, the axial length of the inner race being the same as or smaller than the axial length between the outer faces of the clamping means, said clamping means being located axially on the inner race, means for holding the parts of the clamping means and inner race together and preventing relative axial displacement of these parts, first inwardly directed abutment surfaces integrally formed on said clamping means and flame hardened to resist wear, serving for axial location against the rollers, and second inwardly directed abutment surfaces integrally formed on the outer race parts for axial location against the rollers. The axial location may be accomplished by providing annular grooves in the outer surface of the inner race spaced from the ends of the race and engaged by annular ribs or projections on the clamping means. Alternatively the split clamping means may be integral with the inner race parts.

Constructional forms of the invention will now be described by way of example with reference to the accompanying drawings, wherein:

FIGURE 4 is a side view, partly in section, of a third construction of the bearing made in accordance with the invention.

FIGURE 5 is a side view, partly in section, of a fourth construction of the bearing made in accordance with the invention;

FIGURE 6 is a side view, partly in section, of a fifth construction of the bearing made in accordance with the invention;

FIGURE 7 is a side view, partly in section, of a sixth construction of the bearing made in accordance with the invention.

FIGURE 8 is a side view, partly in section, of a seventh construction of the bearing made in accordance with the invention;

FIGURE 9 is a sectional elevation taken on line B—B of FIGURE 7;

Figure 1:
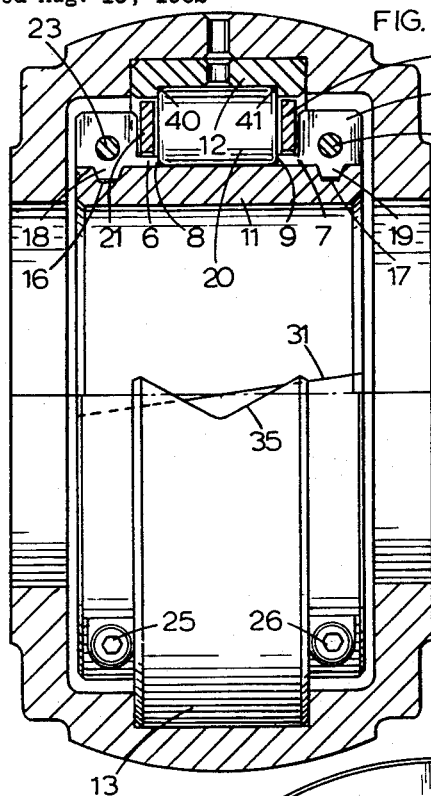
FIGURE 1 is a side view, partly in section, of one construction of a bearing made in accordance with the invention.

In the figures, 10 and 11 are split semi-circular inner race parts; 12 and 13 are split semi-circular outer race parts. In FIGURES 1 to 6, 14 and 15 are split clamping means in the form of split ring parts, made separate from the inner race. Rollers 20 are located between the inner and outer races and are held in spaced relationship circumferentially of the races by a cage 21. The lines of split 31 of the inner race are at an angle to the axis of the bearing and grooves 16, 17 are machined and ground in the exterior surface of the inner race. These grooves are spaced from the ends of the race and receive correspondingly shaped annular ribs or projections 18, 19 on the clamping rings. The clamping rings are made of a flame hardening steel. The projections 18, 19 rigidly position the clamping rings 14, 15 for the axial loading and positioning set up through the rollers 20. The inner race has an unchanging outer diameter except for the grooves 16, 17 so that it can easily be machined and ground. The clamping rings are formed with integral annular lips or flanges 6, 7, the inner surfaces 8, 9 of which form a pair of annular abutment surfaces locating axially against the rollers. These surfaces are flame hardened.

Figure 2:
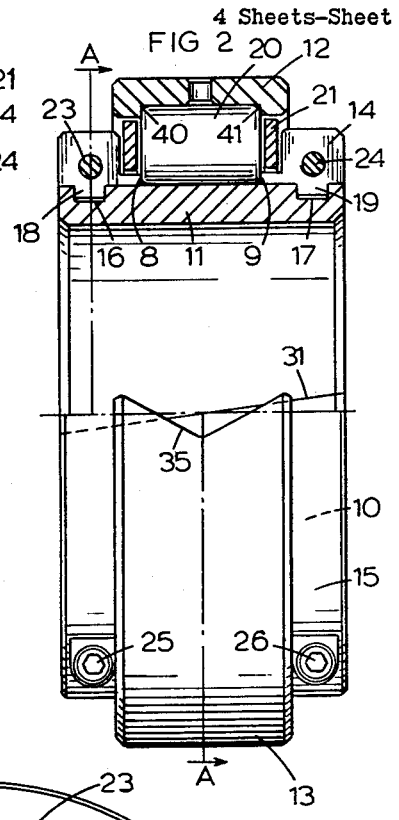
FIGURE 2 is a side view, partly in section, of a second construction of a bearing made in accordance with the invention.
Figure 3:
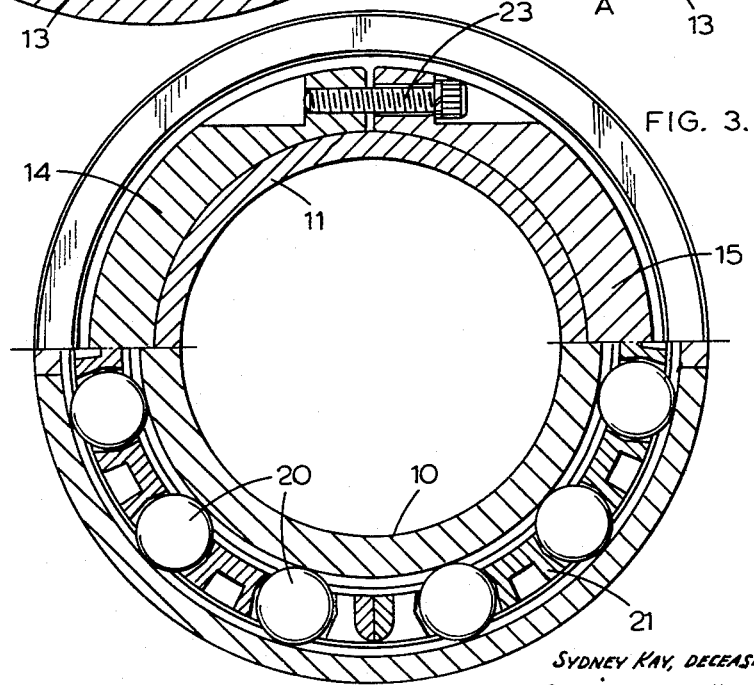
FIGURE 3 is a sectional elevation, taken on line A—A of FIGURE 2.

In FIGURE 1 the grooves and projections are tapered in cross-section. In FIGURE 2 the grooves and projections have sides parallel to each other and to the ends of the races. Screws 23, 24 and 25, 26 disposed on chords of the circular races serve to clamp the clamping ring parts 14, 15 together and in FIGURES 1 and 2 these screws are in the planes of the projections 18, 19. In FIGURE 4, the projections and grooves are offset inwardly from the planes of the screws 23–26 so that the inner surfaces of the projections 18 are contiguous with the abutment surfaces 8, 9.

In FIGURE 5, the clamping rings have tapered bores. The inner race has a taper ground on each end, i.e. the groove is of varying diameter with its deepest part innermost and the clamping ring, when tightened up on the taper will pull down and mate with the vertical face of the inner race. The thrust face of the clamping ring then forms a true ring against which the rollers 20 can run and the thrust taken through the rollers is transmitted to this face.

In FIGURE 6 the grooves are formed as "still" threads and are ground on each end of the inner race. The ribs or projections on the clamping rings 14, 15 are in the form of threads corresponding to the threads on the inner race and these mate together when tightened up. Here again the thrust set up through the rollers 20 is transmitted to the vertical face 8, 9 of the clamping ring.

In FIGURES 7 to 11 the split inner race parts are integral with the clamping ring.

In FIGURES 7 and 9 the two parts are held together by bolts and dowels. The bolts 23, 24, 25, 26, each of which passes with clearance through a bore in one part, are threaded into tapped bores in the other part. The dowels 30 fit tightly in bores in both parts.

In FIGURE 8 movement between the two halves of the inner race is eliminated by means of a tenon joint. At each engaging position one end is provided with a groove 32 and the other half with a tongue 33.

Figure 10:
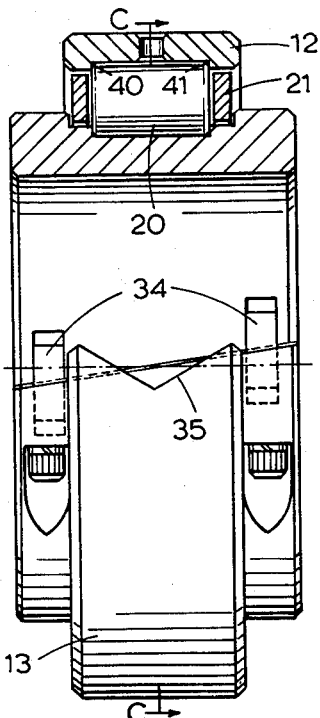
FIGURE 10 is a side view partly in section of another construction of the bearing in accordance with the invention.
Figure 11:
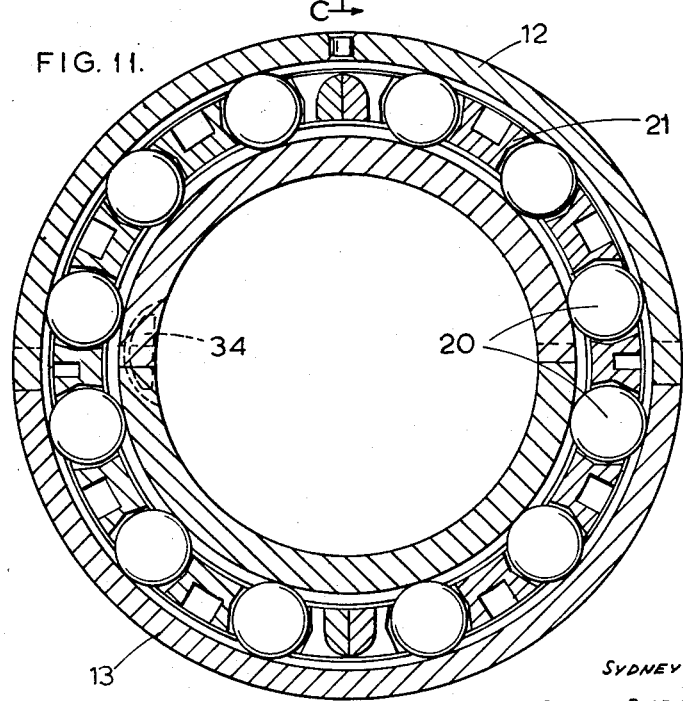
FIGURE 11 is a front sectional elevation taken on center line C—C of FIGURE 10.

In FIGURES 10 and 11 movement between the two halves of the inner race is eliminated by means of half-moon or "Woodruff" keys 34. These keys may be positioned at any part of each joint.

The split outer race part 13 is provided with a V-shaped indent 35 at one end and a corresponding shape projection (not shown) at its other end. The outer race part 12 is similarly provided with an indent and a projection and the two parts are arranged so that the projection of each part mates with the indent of the other part. The outer race 12, 13 has inwardly facing annular abutment surfaces 40, 41.

The bearing is contained in a housing 42 shown only in FIGURE 1 and because of the construction of the bearing this housing can now be exactly the same for a non-locating bearing of similar loading.

I claim:

A roller bearing comprising an inner race split into two approximately semi-circular parts along lines of split that are at an angle to the axis of the bearing, an outer race split into two approximately semi-circular parts along lines of split that are at an angle to the axis of the bearing, cylindrical rollers located radially between the races and having their axes parallel to the axis of the bearing, a cage for locating the rollers in spaced relationship circumferentially of the races, the cage having portions disposed axially beyond both ends of the rollers, annular clamping means split into ring parts and located on each side of the inner race, said inner race having an axial length which is no greater than the axial length between the outer faces of said clamping means, screw means having substantial clearance with one of said ring parts for clamping the ring parts together tightly on the inner race, means positively locating said ring parts in both directions axially on the inner race, at least one integral annular lip on each ring part extending inwardly past adjacent cage parts into contact with the rollers, said ring parts being composed of hardenable steel, said lips being hardened at least where they contact the rollers, means having interengaging surfaces substantially normal to the axis of the bearing positively locating said inner race parts against axial displacement relative to each other in both directions, and inwardly directed abutment surfaces on the outer race parts for axial location against the rollers.

References Cited by the Examiner

UNITED STATES PATENTS

| | | | |
|---|---|---|---|
| 799,471 | 9/05 | Kincaid | 308—216 |
| 991,862 | 5/11 | Lockwood | 308—236 XR |
| 1,024,344 | 4/12 | Langevin | 308—236 XR |
| 1,116,845 | 11/14 | Rogers | 308—236 |
| 1,220,633 | 3/17 | Hirth | 308—236 XR |
| 1,644,611 | 10/27 | Rieffert | 308—216 XR |
| 2,048,972 | 7/36 | Scheffler | 308—236 XR |
| 2,528,987 | 11/50 | Ablett | 308—216 |

FOREIGN PATENTS

| | | |
|---|---|---|
| 132,423 | 5/49 | Australia. |
| 432,621 | 12/11 | France. |
| 446,569 | 2/48 | Canada. |

ROBERT C. RIORDON, *Primary Examiner.*

FRANK SUSKO, *Examiner.*